United States Patent [19]

Chen

[11] Patent Number: 5,232,179
[45] Date of Patent: Aug. 3, 1993

[54] 8 MM VIDEO TAPE REWINDER

[75] Inventor: Stephen Chen, Changhua, Taiwan

[73] Assignee: E Lead Electronic Co., Ltd., Changhua, Taiwan

[21] Appl. No.: 832,140

[22] Filed: Feb. 6, 1992

[51] Int. Cl.⁵ ............................................. G11B 15/32
[52] U.S. Cl. .................................... 242/190; 242/200
[58] Field of Search ............... 242/199, 200, 190, 189, 242/208, 67.4

[56] References Cited

U.S. PATENT DOCUMENTS

| | | | |
|---|---|---|---|
| 4,031,554 | 6/1977 | Umeda et al. | 242/201 |
| 4,159,810 | 7/1979 | Hookinson | 242/198 |
| 4,178,809 | 12/1979 | Hanzawa et al. | 242/201 |
| 4,513,927 | 4/1985 | Tsai | 242/191 |
| 4,563,711 | 1/1986 | Takai | 242/208 |
| 4,622,605 | 11/1986 | Tsuruoka et al. | 242/199 |
| 4,749,147 | 6/1988 | Chen | 242/200 |
| 4,848,699 | 7/1989 | Jing-Lin | 242/201 |

Primary Examiner—Thomas B. Will
Attorney, Agent, or Firm—Browdy and Neimark

[57] ABSTRACT

A 8 mm video tape rewinder including an upper casing and a lower casing, containing a motor, a slide plate, a tape deck, a push button, a transparent cap, a DC seat, a circuit board, a microswitch, a pair of push arms, a rewinding shaft, a driven shaft and multiple springs, whereby when rewinding the tape, the push button is pushed inward to push the slide plate inward so that a pushing rib thereof touches the microswitch and pushes the push arms rearward, and the push rod of the push arm stretches the tape outside the tape casing for rewinding the tape and when the push arms reach the end, a projection of one of the push arms pushes and engages with a rear projecting post of the slide plate so as not to be pulled back by a spring, and when the rewinding operation is completed, the tensioned tape will exert pushing force on the push rod to push away the engaged projection and projecting post, permitting the slide plate to be pulled back by the spring and the transparent cap can be opened for taking out the tape.

6 Claims, 7 Drawing Sheets

8 MM VIDEO TAPE REWINDER

BACKGROUND OF THE INVENTION

The present invention relates to a 8 mm video tape rewinder including a lower casing and an upper casing, which contain a motor, a slide plate, a tape deck, a DC seat, a circuit board, a microswitch, a pair of push arms, a rewinding shaft, a driven shaft, a push button, a transparent cap and multiple springs, whereby the rewinding operation can be performed by simple assembly of these elements to lower the manufacturing cost.

The current video tape rewinder often has complicated structure with multiple functions so that the manufacturing cost thereof is high and the price thereof is thus high. As a consequence, such rewinder is hardly popularized. Moreover, such complicated structure is apt to fail.

SUMMARY OF THE INVENTION

It is therefore a primary object of this invention to provide a 8 mm video tape rewinder which has simple structure with simple function and which can be easily manufactured and assembled to lower the manufacturing cost and the price, permitting such rewinder to be popularized. Moreover, the simple rewinder will not easily fail.

According to the above object, the present invention includes a lower casing, an upper casing, a motor, a slide plate, a tapedeck, a push button, a transparent cap, a DC seat, a circuit board, a microswitch, a pair of push arms, a rewinding shaft, a driven shaft and multiple springs, whereby when rewinding the tape, the transparent cap is first pivoted up and then the tape is inserted into the tape deck and then the cap is closed. Thereafter, the push button is pushed inward by a finger to push the slide plate inward, making a push rib thereof touch the microswitch. At this time, the projections of the push arms extend into the push holes of the slide plate to be driven to stretch the tape outside the tape casing. When the push arms reach the end, a stopper projection of one of the push arms will engage with a rear projecting post of the slide plate so as not to be pulled back by a spring. A time interval of about 1-2 seconds exists between the time the microswitch is activated and the tape is stretched. Therefore, the circuit board is designed with a delay circuit to delay the activation of the motor for 1-2 seconds so that the tape is rewinded after completely stretched. When the tape is completely rewinded, the tensioned tape exerts a pushing force on the push rod and pushes the slide plate. The pushing force and the pulling force of the spring will push away the engaged projections and projecting post, permitting the slide plate to be pulled back by the spring and then the cap can be opened for taking out the tape.

DETAILED DESCRIPTION OF THE PREFERRED EMBODIMENT

Figure 1:
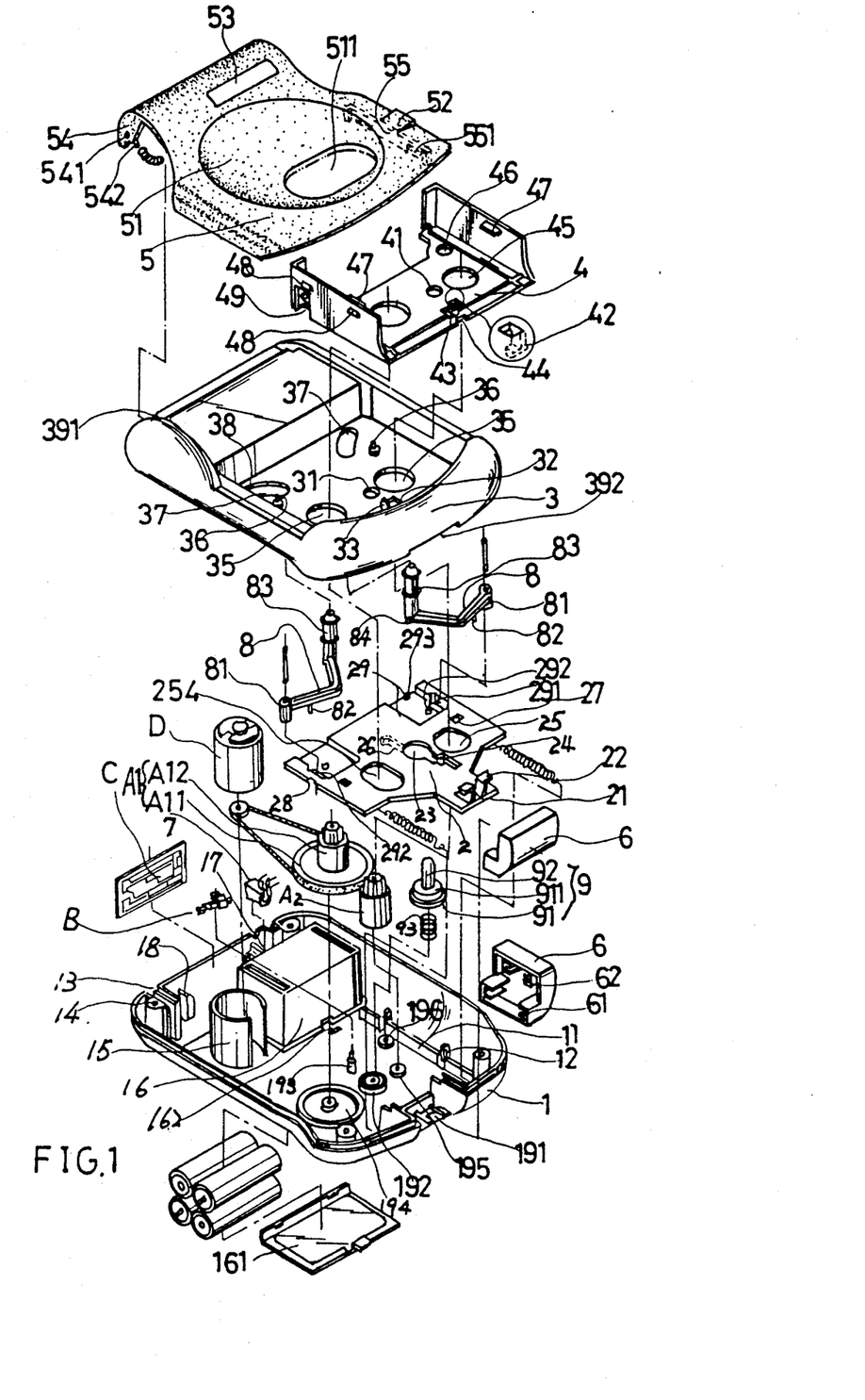
FIG. 1 is a perspective exploded view of this invention.
Figure 2:
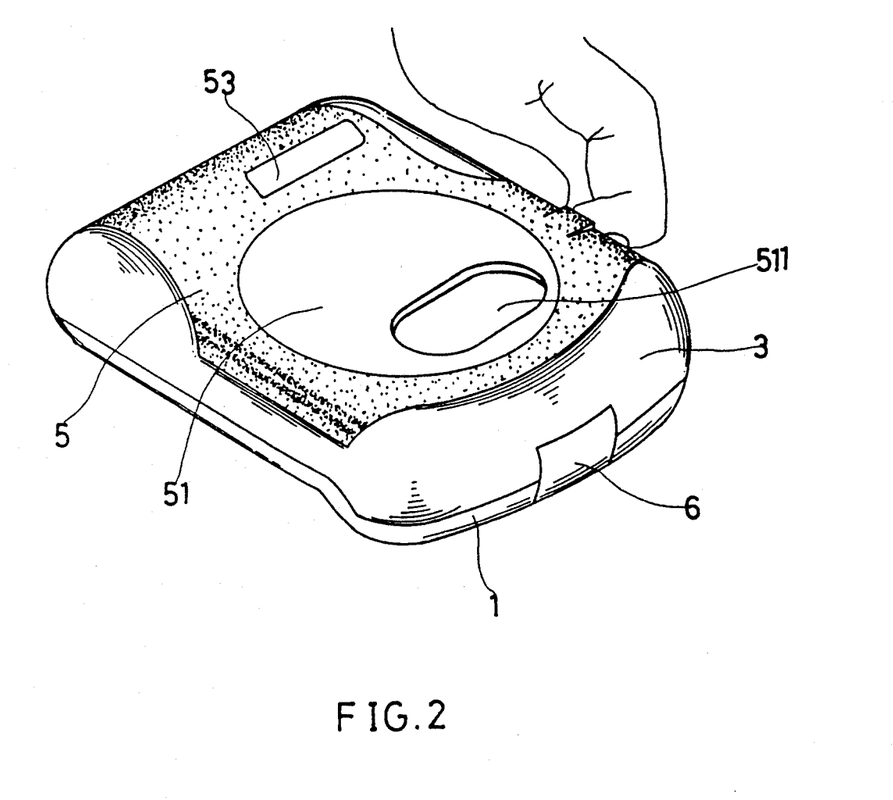
FIG. 2 is a perspective assembled view of this invention.
Figure 3A:
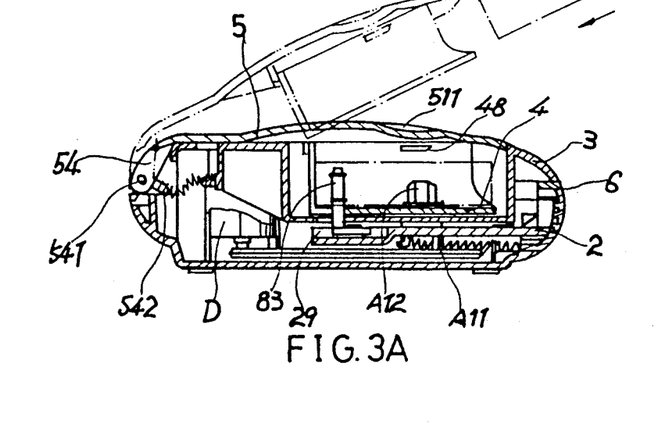
FIGS. 3A, 3B, 3C, 3D, 3E, and 3F show the assembly of this invention.
Figure 3B:
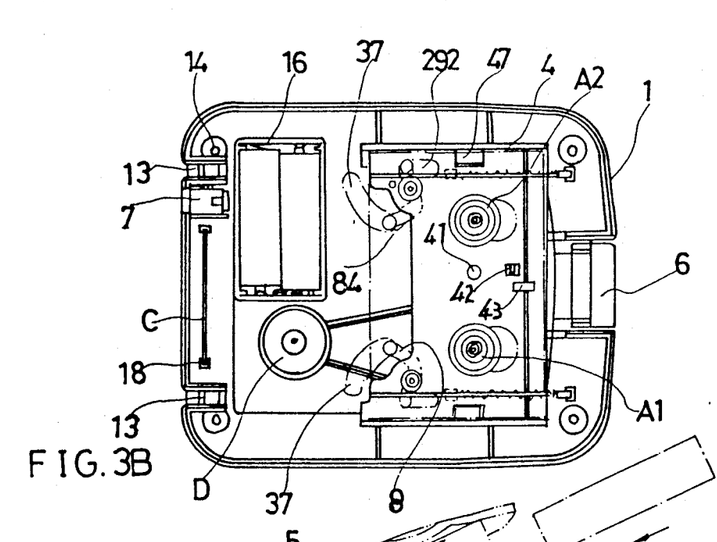
Figures 3C, 3D, 3E, 3F:
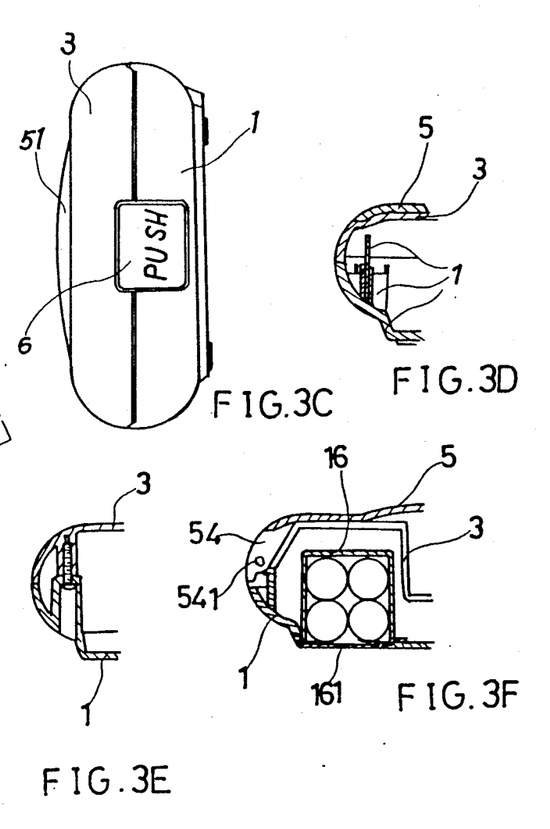

Please refer to FIGS. 1 and 2. The present invention includes a lower casing 1, a slide plate 2, an upper casing 3, a tape deck 4, a transparent cover 5, a button 6, a DC circuit 7, a pair of push arms 8, a controlling pin 9 for controlling the movement of the slide plate 2, a rewinding shaft A1, a driven shaft A2, a microswitch B, a circuit board C, a motor D and multiple screws and springs, wherein the lower casing 1 is provided with two projecting ribs 11 along its two longitudinal lateral walls for slidably supporting the slide plate 2 thereon. Each rib 11 is formed with a front and a rear restricting hooks 12 for limiting the travel of the slide plate 2. Two pivot seats 13 are disposed on rear edge of the lower casing 1 for connecting with the transparent cover 5. Four corners of the lower casing 1 are provided with thread holes 14 for jointing with the upper casing 3 by screws. A motor fixing seat 15 and a cell chamber 16 are disposed in front of the rear thread holes 14. A recess 162 is formed on the chamber 16 for a cap 161 to engage therewith. A DC seat 17 is disposed behind the chamber 16 for the DC circuit 7 and a circuit board fixing seat 18 to fit therewith. A button seat 191 is disposed on the front edge of the lower casing 1 and a controlling pin seat 192 is disposed on the center thereof. A microswitch fixing seat 193 is disposed therebehind and a rewinding shaft seat 194 and a driven shaft seat 195 are disposed on two sides thereof. Two push arm seats 196 are disposed in front of the motor fixing seat 15 and the chamber 16.

The slide plate 2 is substantially T-shaped and placed on the ribs 11 to move within the hooks 12. Two L-shaped projections 22 are vertically disposed on a front projecting plate 21 thereof. The projections 22 can be fitted into a lower and an upper grooves 61, 62 of the button 6. A circular hole 23 is formed on the central portion of the slide plate 2 for controlling the travel thereof. An L-shaped tape deck controlling hole 24 is formed and communicated with the circular hole 23. A first and a second through holes 25A, 25 are formed for the rewinding shaft A1 and the driven shaft A2 to extend therethrough. The second hole 25 is shorter than the first hole 25A so that when the slide plate 2 is returned, the second hole 25 first frictionally contacts the driven shaft A2 to produce braking effect. An L-shaped push rib 26 is disposed under the slide plate 2 and two spring hooks 27 are disposed on outer sides of the holes 25, 25A under the slide plate 2. Two restricting hooks are disposed on two lateral sides of the slide plate 2, extending through recesses 28. Two depressions 29 are formed on rear edge of the slide plate 2 with slots 291 formed thereon for the push arm to extend thereinto. Restricting holes 292 are disposed beside the slots 291. A stopper boss 293 is disposed on one depression.

The upper casing 3 is formed with a tape deck chamber and a through hole 31 for the controlling pin 9 to extend therethrough. A through hole 32 is disposed in front thereof with a tape releasing post 33 and a restricting projecting plate 34 disposed in front of the two holes 31, 32. The projecting plate 34 is used to restrict the travel of the video tape. Two through holes 35 are disposed on two sides of the through hole 31 for the rewinding shaft and driven shaft to extend therethrough. Two restricting posts 36 are disposed on two sides thereof for restricting the video tape. Two arch holes 37 are formed behind the posts 36 for the push arms 8 to move therein. An opening plate 38 for the video tape is disposed beside the arch hole 37 and two transparent cap pivot grooves 391 are disposed on two sides thereof with a button groove 392 formed thereunder.

The tape deck 4 is formed with a central through hole 41 for the controlling pin to extend therethrough. A leg hook 42 is disposed in front of and under the hole 41. A hole 43 is formed beside the leg hook 42 for the posts 33 to extend therethrough. A recess 44 is formed on the lateral edge thereof for the projecting plate 34 to extend therethrough. Two through holes 45 are disposed beside the through holes 41 for the rewinding shaft and driven shaft to extend therethrough. Through holes 46 are further disposed on rear sides thereof for the posts 36 to extend therethrough. Two restricting plates 47 are vertically disposed on inner lateral walls while two projections 48 are disposed on outer side walls for engaging with the cap 5. A through hole 49 is formed on rear edge for the opening plate 38 to extend therethrough.

The transparent cap 5 is formed with obscure figures thereon and a central convex 51 and a transparent portion 511 in front of the convex 51 so that the video tape can be seen through the transparent portion 511. An arch projection 52 is formed adjacent to the front edge thereof for a finger to pick up the cap 5. A smooth portion 53 is formed adjacent to the rear edge thereof for adhering a tape thereon. Two downward extending pivot plates 54 having pivot holes 541 are formed on rear edge thereof. A projection 542 is formed on one of the pivot plate 54 for engaging with a spring. C-shaped ribs 55 are formed under thereunder on two sides thereof. Each rib 55 has two engaging holes 551 for engaging with the projection 48 of the tape deck 4.

The button 6 shown in two different views in FIG. 1, is L-shaped and formed with a lower groove 61 and an upper groove 62 for the projecting plate 21 and the L-shaped rib 22 of the slide plate 2 to engage therewith. The button 6 is seated on the button seat 191 of the lower casing 1.

The DC circuit 7 is mounted on the DC seat 17 of the lower casing 1 for rectifying the alternate current.

The push arms 8 are substantially L-shaped with one end formed with a pivot body 81 to pivotably connect with the pivot seats 196 of the lower casing 1. A push projection 82 is formed beside the pivot body 81 to be rotarily pushed by the push hole 292 of the slide plate 2. The other end of the push arm 8 is formed with an upright push rod 83 which rotates outward to push the tape outside the tape casing for rewinding the tape. One of the push arms 8 is disposed with a stopper projection 84 besides the push rod 83.

The controlling pin 9 has a two step disk 91 and a hollow pin body 92 located thereon. The pin 9 is inserted in the pin seat 192 of the lower casing 1. Annular grooves are formed thereon with spring 93 fitted therein to support the controlling pin 9 to vertically move under the slide plate 2. The hollow pin body 92 can extend through the controlling hole 23 of the slide plate 2, the through hole 31 of the upper casing 3 and the through hole 41 of the tape deck 4 to abut against the video tape in the deck 4. The upper disk 911 of the two step disk 91 can vertically move within the controlling hole 23 of the slide plate 2 whereby when it goes into the hole 23, it stops the slide plate 2 from moving and after the controlling pin 9 is pressed down by the video tape inserted into the tape deck 4 and the small disk 911 is retreated downward, the slide plate 2 can then pushed.

The rewinding shaft A1 includes a pulley A11 and a rewinding rod A12 located thereon, and is pivotally mounted on the pivot seat 194 of the lower casing 1. The pulley A11 is directly driven by the motor D.

The driven shaft A2 is identical to the rewinding shaft A12 of the rewinding shaft A1 and is pivotally mounted on the pivot seat 195 of the lower casing 1 to be rotarily driven by the tape when rewinded.

The microswitch B is mounted on the fixing seat 193 of the lower casing 1 to be pushed by the push rib 26 of the slide plate 2 to activate the motor.

The circuit board C includes a delay circuit with a delay time equal to the time from the microswitch B is activated to the tape is extended outside the tape casing by the push arm 8 to prepare to rewind the tape.

The motor D is mounted on the fixing seat 15 of the lower casing 1.

Figure 4:
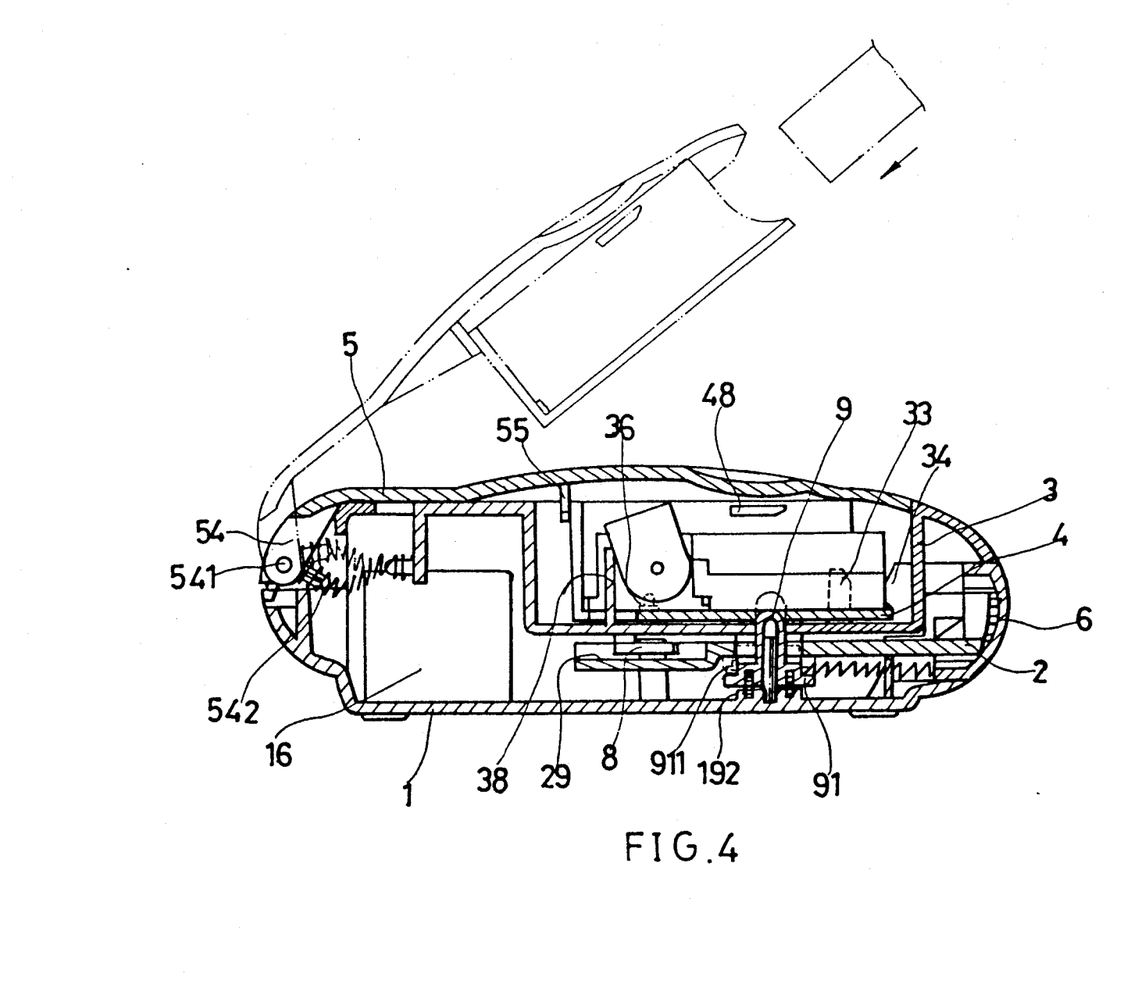
FIG. 4 shows the operation of inserting the tape and closing the cap.

According to the above arrangement, as shown in FIGS. 2 and 3A-3F, when rewinding the tape, the arch projection 52 of the cap 5 is picked up by a finger and then the video tape is inserted into the deck 4 under the cap 5 as shown by the phantom line of FIG. 4. Then the cap 5 is closed as shown by the solid line of FIG. 4. The projection 36 of the upper casing 3 will extend through the through hole 46 of the deck 4 to abut against the recess of the video tape casing. The projecting plate 34 will extend through the recess 44 to abut against the rear lateral edge of the tape casing, while the rewinding shaft A1 and driven shaft A2 will extend through the through holes 25, 35 and 45 of the slide plate 2, upper casing 3 and tape deck 4 to go into two tape wheels of the video tape to locate the video tape. The tape releasing projecting post 33 will extend through the through hole 43 of the deck 4 and enter the tape releasing hole of the tape to loosen the tape for rewinding the same. The opening plate 38 extends through the through hole 49 of the deck 4 to open the front cover of the tape casing. Also, the tape casing presses the controlling pin 9 downward to downward retract the small disk 911 out of the controlling hole 23 of the slide plate 2. At this time, the button 6 can be pressed to push the slide plate. In addition, the leg hook 42 of the deck 4 extends downward through the controlling hole 24 of the slide plate 2.

As shown in FIG. 4, one of the pivot plates 54 is formed with a projection 542 opposite to a projection of the upper casing whereby two ends of an opening spring can be fitted with the two projections so as to be deformed in two different manners when the cap is pivotally closed or opened to locate the cap.

Figure 5:
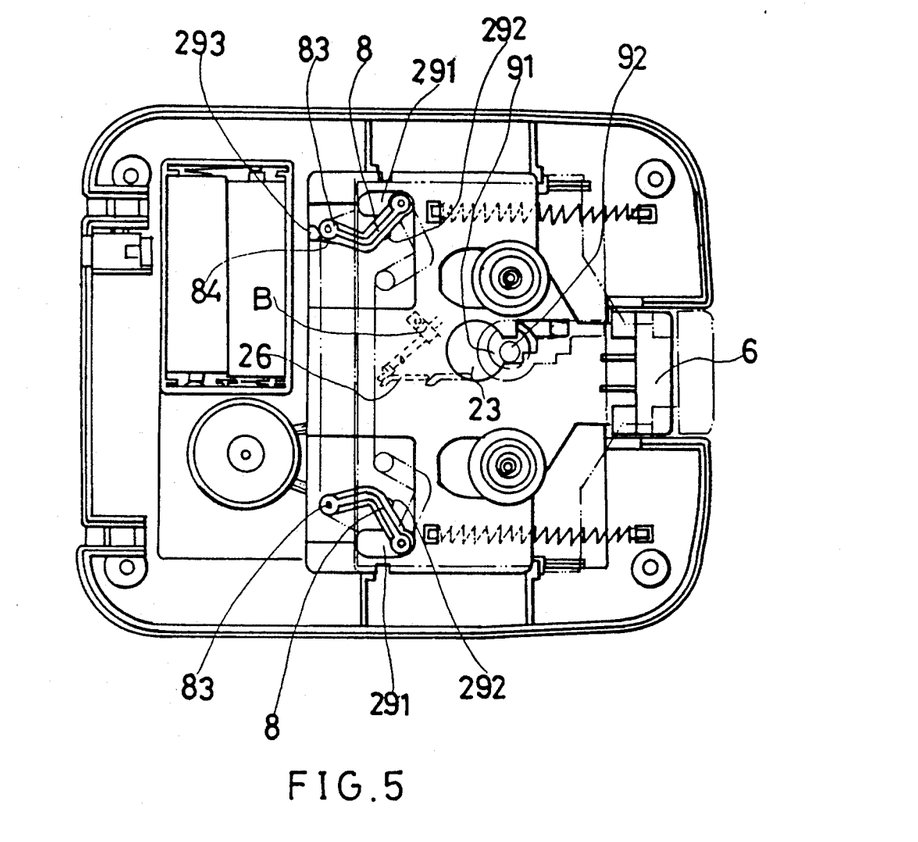
FIG. 5 shows the movement of pushing the push button inward.

As shown in FIG. 5, the push button 6 is pushed inward to make the slide plate 2 slide inward. At this time, the push hole 292 outward pushes the push projections 82 of the push arms 8 and simultaneously stretch the tape outward. Also, the push ribs 26 of the slide plate 2 touch and push the microswitch from the position shown by the phantom line to the position shown by the slide line of FIG. 5. However, the motor will not be activated until the tape is completely stretched out. A delay circuit is therefore required to provide a time delay matching with the time difference between the activation of the microswitch and the completion of the stretch of the tape.

Figure 6:
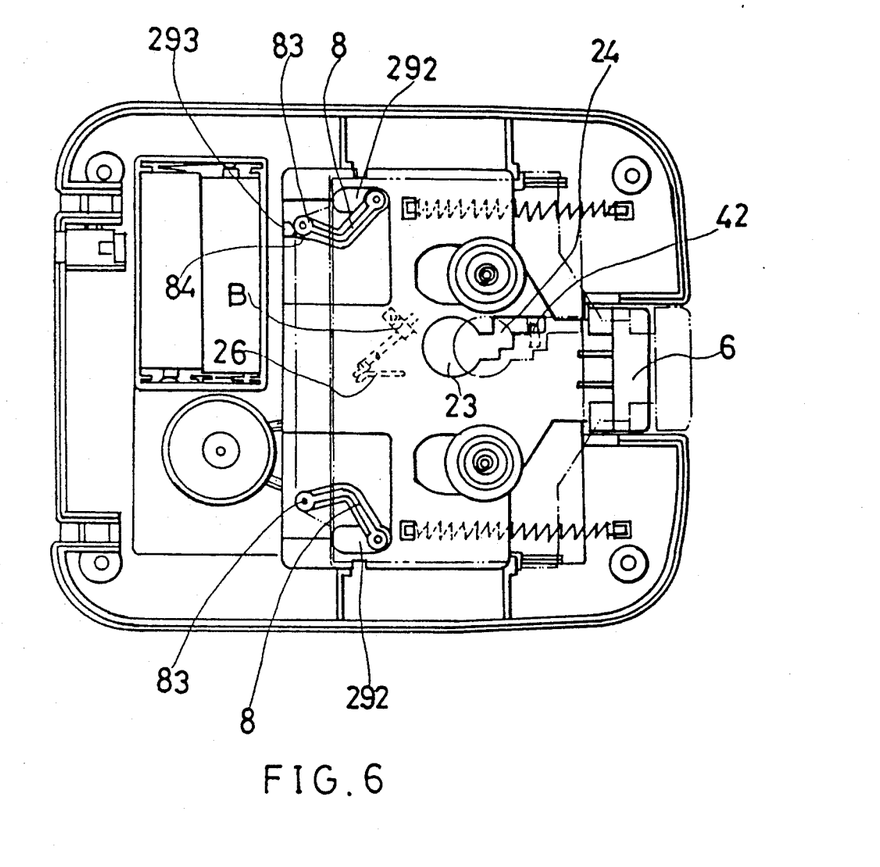
FIG. 6 shows that the stopper projection is engaged with the projecting post and the leg hook of the tape deck is restricted by the slide plate.

As shown in FIG. 6, when the slide plate 2 reaches the end, the stopper projection 84 of the push arm 8 will be biased against the stopper projection 293 of the slide plate 2. Also, the L-shaped controlling hole 24 thereof will be moved inward with its wide portion angled apart from the leg hook 42 and its narrow portion restricting the leg hook 42 from detaching therefrom so as to prevent the video tape from being ejected during rewinding and thus being damaged as shown by the phantom line and solid line of FIG. 6.

Figure 7:
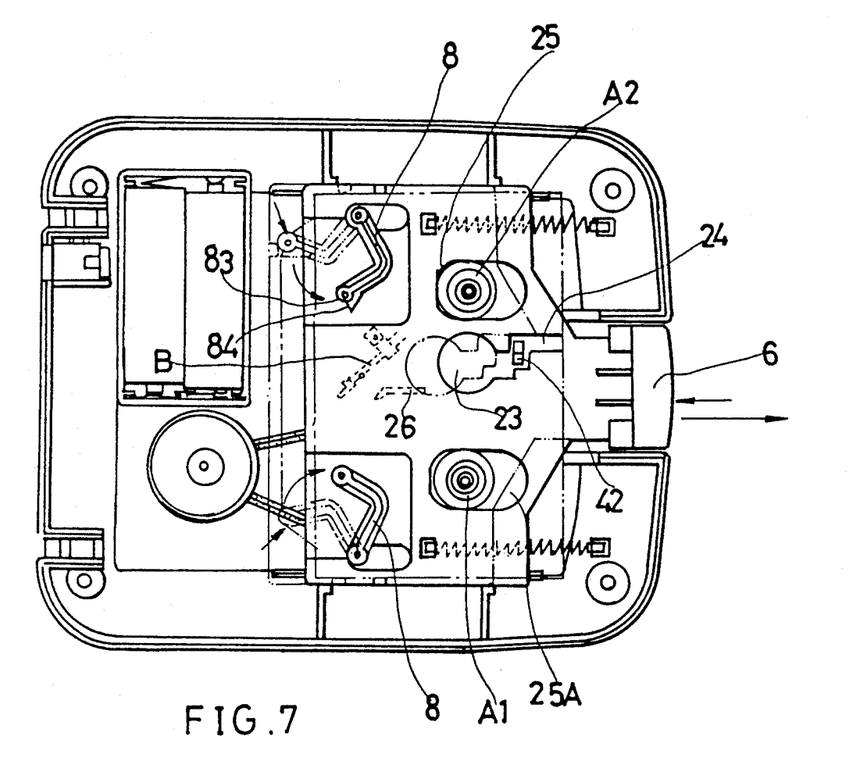
FIG. 7 shows that the rewinding operation is stopped midway and the push button is pressed inward.

As shown in FIG. 7, when the rewinding operation should be stopped midway, the button 6 can be further pushed inward by a finger to make the engaged projections 84 and projecting post 293 angled apart to eliminate the stopping force. Thus the tension of the tape and the pulling force of the spring will pull back the slide plate 2. When the slide plate 2 is retracted, since the through hole 25 for the driven shaft is shorter, one end thereof will first contact the driven shaft A2 to brake and stop the same to prevent the tape from being over-rewinded due to inertia. Simultaneously, the push arms 8 will be retracted and the push ribs 26 touching the microswitch B will be retreated to stop the rewinding operation. At this time, the controlling hole 24 of the slide plate 2 is moved back with its narrow portion angled apart from the leg hook 42 and its wide portion aligned with the leg hook 42 as shown by the phantom line and solid line of FIG. 7. At this time, the force stopping the leg hook 42 which restricts the tape deck 4 is eliminated so that the cap 5 can be opened by a finger and the tape can be taken out.

If the rewinding is not stopped midway, when the tape is rewinded to the end, the gradually tensioned tape will exert gradually increased pushing force on the push arms 8 whereby when the sum of such pushing force and the pulling force of the spring is larger than the engaging force between the projection 84 and the projecting post 293, the push arm 8 can be pushed away and the slide plate 2 is pulled back by the spring. Finally, the cap 5 can be opened for taking out the tape.

What is claimed is:

1. A 8 mm video tape rewinder comprising:
    a lower casing,
    an upper casing fixedly engaged to said lower casing,
    a tape deck chamber formed on an upper side of said upper casing,
    a cover having a tape deck thereon pivotedly engaged to said upper casing over said tape deck chamber,
    a slide plate in slideable and spring biased engagement to said lower casing,
    a controlling pin in spring biased engagement along a longitudinal length on said lower casing and extending through said slide plate and said upper casing into said tape deck chamber,
    stop means on said controlling pin and said slide plate for limiting slideable motion of said slide plate when said controlling pin is extended into said tape deck chamber and
    a pair of push arms pivotable on said lower casing and extending into said tape deck chamber,
    a rewinding shaft and a driven shaft for engagement of tape spools of an 8 mm video tape cassette rotatably mounted on said lower casing and extending into said tape deck chamber,
    motor means mounted on said lower casing for driving said rewinding shaft,
    switch means engaged to said lower casing and said slide plate for actuating said motor means,
    wherein, said pair of push arms engage and stretch a tape of said 8 mm video tape cassette engaged in said tape deck when said cover is closed to depress said controlling pin and engage said 8 mm video tape cassette to said rewinding shaft and driven shaft and said switch means is actuated against said spring biased engagement of said slide plate to turn on said motor means and simultaneously slide said slide plate to pivot said pair of push arms.

2. The 8 mm video tape rewinder according to claim 1 further comprising;
    lock means on said slide plate and at least one of said pair of push arms for holding said slide plate against said pair of push arms when said switch is actuated to turn on said motor means and simultaneously slide said slide plate to pivot said pair of push arms,
    wherein said lock means is disengaged by a tension force of said tape when rewinding of said tape has been completed and spring return of said slide plate turns said switch off to stop said motor means.

3. The 8 mm video tape rewinder according to claim 1, wherein said stop means comprises:
    a central circular controlling hole communicating with an L-shaped tape deck controlling hole on said slide plate,
    said controlling pin having a cylindrical upper portion and a cylindrical lower portion,
    a diameter of said upper portion being smaller than the diameter of said lower portion and a width of said L-shaped tape deck controlling hole,
    a diameter of said lower portion corresponding to a diameter of said central circular controlling hole,
    wherein, when said tape deck chamber is empty said lower portion of said controlling pin engages said central circular controlling hole to limit slideable movement of said slide plate and when an 8 mm video tape cassette is inserted into said tape deck chamber to depress said controlling pin said lower portion of said controlling pin is disengaged from said slide plate to permit slideable movement of said slide plate.

4. The 8 mm video tape rewinder according to claim 1, wherein,
    when stretching said tape, said push arms are driven by two push holes of said slide plate to stretch said tape outward and when said push arms reaches a limit of pivoting, a stopper projection on at least one of said pair of push arms abuts against a stopper projecting post located on a rear edge of said slide plate to prevent said slide plate from being pulled back by a spring, wherein, when a rewinding operation is nearly completed, a pushing force exerted by said tape on said pair of push arms is increased and a sum of said pushing force and a pulling force of said spring is larger than an engaging force between said stopper projection and said projecting post, said pair of push arms are pushed away and said slide plate is pulled back by said spring and said switch means disengages to stop said motor means.

5. The 8 mm video tape rewinder according to claim 4, wherein a through hole for said driven shaft on said slide plate is shorter than a through hole of said rewinding shaft on said slide plate so that when a rewinding operation is stopped before rewinding has been completed and said projecting post and said stopper projection are disengaged and said slide plate is pulled back, a rear end of said through hole for said rewinding shaft will first contact said driven shaft to brake and stop said driven shaft so as to prevent said tape from being over-rewinded.

6. The 8 mm video tape rewinder according to claim 1, wherein said cover has two rear pivot plates one of which is provided with a first projection opposite to a second projection on said upper casing, whereby said first projection and said second projection are respectively fitted with two ends of a spring which is deformed in two different directions when said cap is opened or closed to locate said cap.

* * * * *